(12) United States Patent
Michaud et al.

(10) Patent No.: US 10,551,808 B2
(45) Date of Patent: Feb. 4, 2020

(54) COMPUTERIZED AND ELECTRONIC PLATFORM FOR DRIVING URBAN EQUIPMENT

(71) Applicant: Sinovia, Issy les Moulineaux (FR)

(72) Inventors: Stéphane Michaud, Le Plessis Robinson (FR); David Montoya, Issy les Moulineaux (FR); Franck Signorile, Athis-Mons (FR)

(*) Notice: Subject to any disclaimer, the term of this patent is extended or adjusted under 35 U.S.C. 154(b) by 731 days.

(21) Appl. No.: 15/113,532

(22) PCT Filed: Jan. 23, 2015

(86) PCT No.: PCT/FR2015/050167
§ 371 (c)(1),
(2) Date: Dec. 19, 2016

(87) PCT Pub. No.: WO2015/110766
PCT Pub. Date: Jul. 30, 2015

(65) Prior Publication Data
US 2017/0153612 A1    Jun. 1, 2017

(30) Foreign Application Priority Data
Jan. 24, 2014    (FR) ...................................... 14 50596

(51) Int. Cl.
*G05B 19/042*    (2006.01)
*H04L 29/08*    (2006.01)

(52) U.S. Cl.
CPC .. *G05B 19/042* (2013.01); *G05B 2219/23154* (2013.01); *G05B 2219/2637* (2013.01); *H04L 67/12* (2013.01)

(58) Field of Classification Search
CPC ...... H04L 67/12; H04L 67/125; G05B 19/042
See application file for complete search history.

(56) References Cited

U.S. PATENT DOCUMENTS 7,188,085 B2 * 3/2007 Pelletier ................. G06Q 30/02
                                                701/516
2003/0093430 A1 * 5/2003 Mottur ............... H04N 5/23203
(Continued)

FOREIGN PATENT DOCUMENTS

WO        02082400 A2    10/2002
WO    2006136985 A1    12/2006
(Continued)

OTHER PUBLICATIONS

International Search Report for International Application No. PCT/FR2015/050167 dated May 28, 2015, 5 pages with translation.
(Continued)

*Primary Examiner* — Tuan C Dao
(74) *Attorney, Agent, or Firm* — TraskBritt

(57) ABSTRACT

The disclosure relates to a computerized and electronic platform for driving urban equipment of various categories, wherein the computerized and electronic platform comprises an information base in which are recorded: category-based digital representations of each of the categories, each consisting of a plurality of attributes specific to the category considered; functional scripts controlling processing operations applied periodically for each of the items of equipment; a digital object whose structure is determined by the digital representation associated with the category and whose attribute values are determined as a function of the physical state of the associated item of equipment; a dialogue and interfacing layer common to the digital representations and ensuring the exchanges of digital information between the items of equipment of each of the categories and the associated digital object; and communication drivers associated with each of the items of equipment, ensuring the conversion of physical data into digital data.

17 Claims, 1 Drawing Sheet

(56) References Cited

U.S. PATENT DOCUMENTS

| | | | |
|---|---|---|---|
| 2005/0254505 A1* | 11/2005 | Chang | H04L 67/12 |
| | | | 370/401 |
| 2006/0187032 A1* | 8/2006 | Kunkel | G06Q 10/06 |
| | | | 340/539.22 |
| 2006/0248557 A1* | 11/2006 | Stark | H04N 21/4126 |
| | | | 725/37 |
| 2007/0036525 A1* | 2/2007 | Chang | G11B 20/10527 |
| | | | 386/232 |
| 2013/0013544 A1 | 1/2013 | Lee | |
| 2013/0054280 A1* | 2/2013 | Moshfeghi | G06Q 10/02 |
| | | | 705/5 |
| 2013/0262557 A1 | 10/2013 | Kim et al. | |
| 2014/0364153 A1* | 12/2014 | Ren | G01S 19/14 |
| | | | 455/456.4 |
| 2015/0087323 A1* | 3/2015 | Srikanteswara | H04W 16/04 |
| | | | 455/452.1 |

FOREIGN PATENT DOCUMENTS

| | | | |
|---|---|---|---|
| WO | 2008069409 A1 | 6/2008 | |
| WO | 2009121619 A1 | 10/2009 | |
| WO | 2013001227 A1 | 1/2013 | |

OTHER PUBLICATIONS

International Written Opinion for International Application No. PCT/FR2015/050167 dated May 28, 2015, 7 pages.
French Search Report for French Application No. 1450596 dated Oct. 8, 2014, 2 pages.

* cited by examiner

COMPUTERIZED AND ELECTRONIC PLATFORM FOR DRIVING URBAN EQUIPMENT

CROSS-REFERENCE TO RELATED APPLICATIONS

This application is a national phase entry under 35 U.S.C. § 371 of International Patent Application PCT/FR2015/050167, filed Jan. 23, 2015, designating the United States of America and published as International Patent Publication WO 2015/110766 A1 on Jul. 30, 2015, which claims the benefit under Article 8 of the Patent Cooperation Treaty to French Patent Application Serial No. 1450596, filed Jan. 24, 2014.

TECHNICAL FIELD

The invention relates to urban platforms for driving equipment hardware and subsystems.

This equipment, for example, includes public lighting lamp posts, closed circuit television surveillance cameras, collective electric vehicle charging stations, sound sensors, pollution sensors, etc.

The subsystems are, for example, another equipment supervisor, for example, for the acquisition of waiting times in a public service.

For the purposes of this disclosure, "urban" refers to collectively used locations, such as territorial subdivisions (cities, towns, villages), but also districts, commercial or residential areas.

BACKGROUND

Known in the state of the art is international patent application WO 2013/001227 concerning a technique to configure a physical entity in a supervision and control system built into a communications network, the system comprising a plurality of sensors. The technique comprises the following steps:
- detection of the presence of a physical entity to configure into the system by the analysis of data received from at least a part of the sensors, without the physical entity itself using means of communication;
- selection of a representative model of the physical entity using a comparison of at least a part of the data received from the sensors and the parameters of pre-recorded models of representations of physical entities;
- creation of a software entity representing the detected physical entity using the selected model.

The disclosure also relates to a configuration system using such a technique and to a supervision and control system comprising such a system.

Patent application WO 2006/136985 describes a method of controlling a lighting control network. Position information comprising the coordinates of each device in the network is received via a gateway in a data processing device that stores the identified functional requirements. The coordinates of each device in the network are used to derive the required functionality of the device, based on the recorded functional requirements, the instructions to implement the functionality are produced, and the instructions are sent to the network through the gateway.

Patent application WO 2009/121619 relates to a computer-assisted system for the administration and/or control of a building management system with multiple devices, particularly lighting, sensors and/or transmitters of commands located in different rooms, which comprises a database that stores information about the devices, sensors and/or transmitters of commands from the building management system, as well as data on the axes and cell structure of the building. The system is designed to provide a graphical user interface on a display screen on which is shown a graphical representation of the building as well as the location of the devices, sensors and/or transmitters of commands.

International patent application WO 2002/082400 relates to an event detection and storage system comprising: a vehicle detection device connected to an input connection point to detect the passage of a vehicle, a red light detector for a traffic light, a registered vehicle control system, a control module that takes an image of an offense, combined with the registered vehicle control system, a video imaging device providing images to the control module, a radar, a data transmission and reception device connected to the radar, a speeding alert device, and a signaling control connected to an output connection point, the system being configured so that when it operates, a film is generated so that when an event occurs, a film is obtained of the moments preceding the event, during the event and after the event. The disclosure also relates to an event detection system that uses the disclosed system.

Also known is United States patent application US 2013/013544 that describes an exclusive ubiquitous city middleware device to provide services to a ubiquitous city. The middleware device performs a role equivalent to the human brain by collecting ubiquitous city data via converging cabled and wireless networks, analyzing the collected data, and finding an optimum service based on a given command and inferred data concerning a current context, and performs the service. The exclusive ubiquitous city middleware operates using a three-tier method using a ubiquitous city infrastructure and a ubiquitous city portal and performs various functions that are built into it, the operating technique and the performance of the functions using general computer operating systems.

Drawbacks of the Prior Art

The prior art urban control platforms require heavy programming each time the equipment assets are modified, in particular, when adding new categories of equipment to be controlled.

Modifications to the programming may lead to a loss of coherency in the global platform operations and incorrectly controlled interactions between the various processed data.

Finally, prior art solutions dissociate the processing of data for the technical control of equipment by the local subdivision technical services, from data processing usually carried out on another technical platform for elected representatives and the public administration services in order to make strategic choices requiring more aggregated data.

Prior art solutions also employ redundant technical resources and have a low level of evolutivity and extension to new categories of equipment or new processing.

The solved technical problem is the problem of the modularity of the controlling system, making it possible to reconfigure the control of a plurality of types of equipment, of a heterogeneous type, using simple interventions and avoiding the modification of the control program.

Solution Provided by the Disclosure

In order to remedy the disadvantages of the prior art, this disclosure concerns a computer and electronic platform in the widest meaning of the term, used to control different categories of urban equipment characterized by the fact that it comprises a database in which are recorded:

- category-related digital representations of each category, the category-related digital representation comprising:
  - a plurality of attributes specific to the category in question; and
  - functional scripts controlling processes applied regularly;
- to each item of equipment, a digital object of which the structure is determined by the digital representation associated to the category, and of which the attribute values are determined by the physical state of the associated equipment;
- of a dialogue and interfacing layer, common to the digital representations, and providing the exchanges of digital data between the equipment in each category and the associated digital object,
- communications drivers associated to each equipment, providing the conversion of physical data into digital data used to refresh the attribute values of the digital objects associated with the equipment.

Advantageously, the database includes global digital representations composed of:

- a plurality of attributes specific to a grouping of linked category-related representations;
- functional scripts controlling processes applied regularly, for a heterogeneous subset of equipment, a globalized digital object of which the structure is determined by the digital representation associated with the subset, and of which the attribute values are calculated depending on the attribute values of the category-related digital objects of the subset.

In a specific embodiment, at least one of the attribute values of an attribute of a globalized digital object is calculated depending on digital data coming from a source other than a connected category-related representation.

In one alternative, at least one of the attribute values of a globalized digital object is calculated according to the attribute values of the linked category-related digital objects related to the subset, the calculation processing being chosen from a processing family comprising:

- a summation of the attribute values of the linked digital objects;
- the calculation of the maximum, minimum, median or mean attribute values for the linked digital objects;
- a logical operator or a logical function applied to the linked digital objects; and
- a conditional operation applied to the linked digital objects.

Preferably, the frequency of the exchanges of digital data between the equipment in each category and the associated digital object controlled by the dialogue and interfacing layer is constant:

- the platform has a variable frequency control circuit for the calculation processing of the attribute values of globalized digital objects depending on the attribute values of the category-related digital objects linked to the subset, the calculation frequency of the globalized digital objects being less than the calculation frequency of the attributes of the linked digital objects.

In another alternative, some of the equipment is statistical, some of the equipment is mobile and comprises geo-location resources of which the state is transmitted to the communications driver by a radio-frequency link.

In another embodiment, the platform also comprises at least one viewing terminal controlled by a calculator depending on the attribute values of at least part of the globalized digital objects or the category-related digital objects.

Advantageously, the viewing terminal also includes resources to send control data processed by the functions of at least part of the category-related digital objects, to control a change in state of the associated equipment.

In another alternative, the platform also comprises automated resources to send control data processed by the functions of at least part of the category-related digital objects, to control a change in state of the associated equipment.

In another specific embodiment, the database also comprises reference value records, and regular comparison resources of the attribute values and the reference values to conditionally trigger an action.

Preferably, at least some of the attribute values are recorded with a history of the variations in the values.

BRIEF DESCRIPTION OF THE DRAWING

This disclosure can be better understood on reading the following description of a non-limiting embodiment, in which.

DETAILED DESCRIPTION

Figure 1:
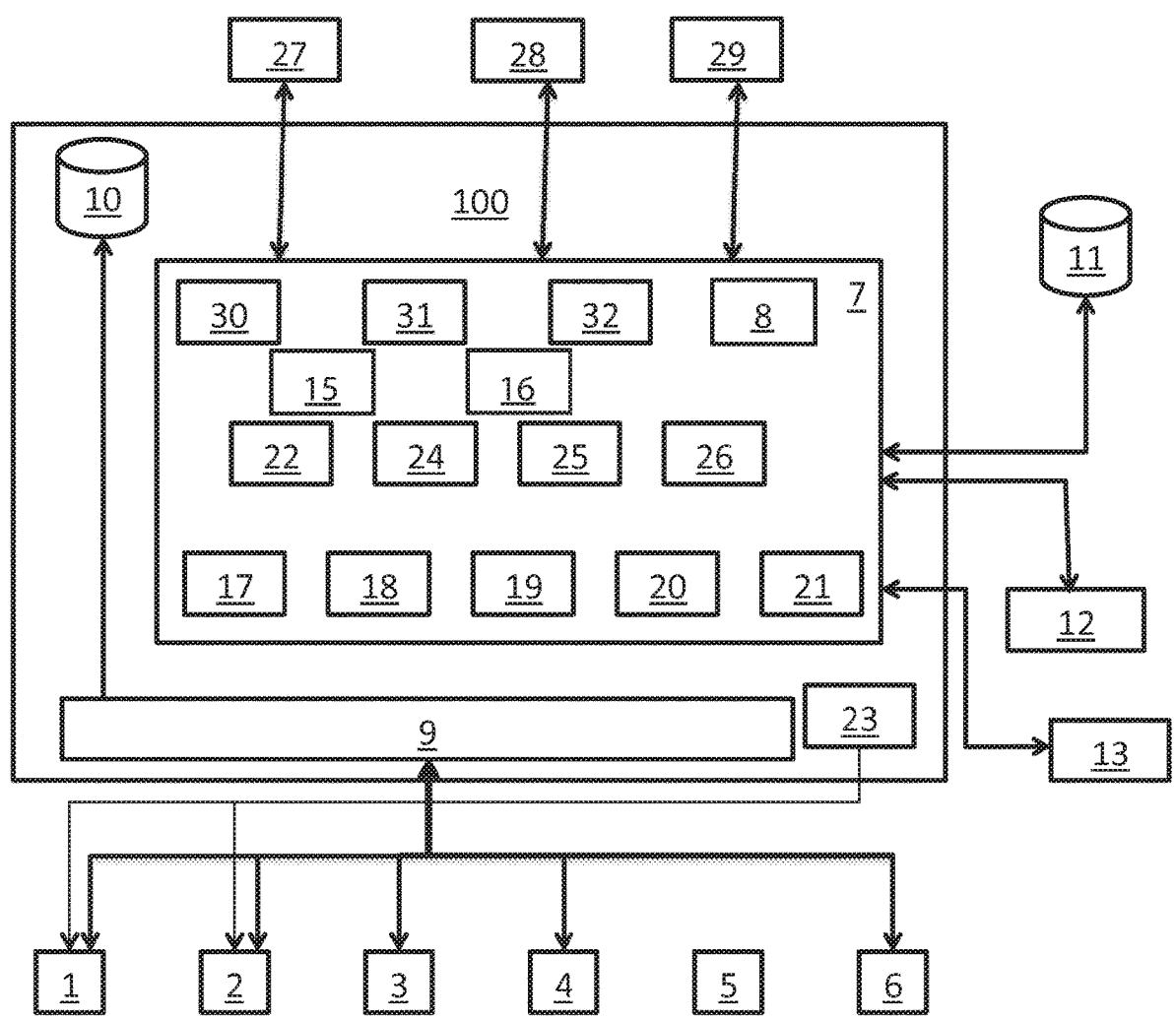
FIG. 1 is a principle diagram of a system of the disclosure.

FIG. 1 is a schematic view of a system of the disclosure.

FIG. 1 comprises a plurality of urban equipment exchanging digital data with a computerized system to control equipment hardware and subsystems.

This equipment comprises:

- closed circuit surveillance cameras 1. Cameras 1 can be static, continuously or regularly capturing an image with a determined angle of view, sending a video stream. They can also be controllable cameras, comprising motorized elements used to alter the angle of vision and the zoom using control information from the platform that will be described hereinafter;
- urban lighting 2 comprising lighting level control resources (dimming) controllable by the platform, and comprising sensors to detect faults or surrounding light levels, and power data sensors delivering digital signals available via the platform;
- electric vehicle charging stations 3 comprising user identification resources, delivering digital identification data processed by the server to calculate the authorization to activate the power supply, platform charge control resources depending on the data sent by the station via the user identification, and from endogenous data such as "peak hours/cheap hours";
- digital data sources 4, 5 coming from an HTTP or FTP server, for example, web sites, hosting free access data, for example, weather data, traffic-related data, and, more generally, all public data supplied especially by a civil service department or a public service. Some digital data sources 5 are comprised of supervisors that aggregate data from other equipment, and supply digital data calculated according to this external data;
- mobile equipment 6, for example, smartphones allowing a person to deliver geo-located data, for example, data relating to an accident or notifying of an event.

Each item of equipment (1 to 6) comprises a communications driver allowing:

the conversion of digital or analogue signals supplied by one or more sensors to format them in accordance with a protocol and a unified data structure specific to the platform;

and/or to supply digital or analogue control signals for an electromechanical resource of one or more items of equipment (1 to 6), depending on the information from the platform, according to a protocol and a unified data structure.

Usually, a single driver is interfaced with several items of equipment of the same type.

The platform 100 comprises an open program interface allowing integrators to directly develop equipment drivers that are not available on the platform as a standard.

The platform 100 also comprises a library of downloadable drivers 23 for the purpose of installing them on a computer system designed to dialogue with the platform 100.

The platform 100 comprises a central server 7 hosting the control application meta model, and storing the digital data in a relational database (SQL, for example). This database is organized into a set of tables, each corresponding to an object type (or object model).

The table structures are defined dynamically, depending on project constraints and the types of object to supervise.

The objects are described in a hierarchical structure using a modelling application 8 to create maps, object models, etc.

The modelling defines a hierarchy of levels connected by 1 to N relationships between the higher and lower level.

For example, the upper level corresponds to the "CITY," the next level down is the "DISTRICT," and the lowest level, the item of "EQUIPMENT."

The relationships are of the "is part of" type, defining a "parent/child" relationship. They are configured using an object and relationship management tool 16.

These relationships define the tree structuring of the objects using a modelling tool 15. This structuring defines the aggregating processes of unit data from the equipment, to calculate significant aggregated data at a higher level. This aggregated data is, for example:

the number of defective sensors or sensors in a specific state, within the level in question; and the average, sum or total power in the level in question.

The data is processed by an aggregation engine 9 in cascade, i.e., with a first level of aggregation processing at the level directly higher than the equipment (1 to 6) level, then by a second processing using this aggregated data to calculate a new level of aggregation at the directly higher level.

These processes are fully modular, and a modification of the composition or number of items of equipment (1 to 6) does not require the modification of the central server 7.

All of the unit and aggregated data can be archived with a timestamp on an archival server 10, depending on the attributes assigned to each property of the object models. These attributes define:

the archival frequency;

the archival conditions (for example, only when the value changes); and the expiry date, controlling the deletion of data after a predetermined length of time.

This solution makes it possible to optimize the resources assigned to archival.

The central server 7 is interfaced with a messaging server 11 to automate functions such as:

the sending of alarm messages; and the regular distribution of an operations report.

Central server 7 is also interfaced with a geographical information system 12, supplying map backgrounds and the coordinate reference and graphic representation (geographical projections).

Each object can be represented on a map projection using an icon that represents its location, its type, and its status.

The central server 7 is also interfaced with an automatic report system 13 that directly uses the data recorded in the relational database 8.

The central server 7 comprises the resources to manage and configure the interactions between the objects, in addition to aggregation, especially:

a script manager allowing an administrator to create functions to analyze values of the attributes of an object and controlling an action;

alarm management 17 calculating the activation of alarms depending on the types of alarm, the triggering categories, and depending on unit or aggregated data; and user rights management 18.

The central server 7 also comprises a scheduler 19 controlling the activation of scripts or functions in a defined order and at a pre-defined frequency.

The central server 7 also optionally comprises a planning manager 20, for example, to manage on-call duties, and an event manager 21, making it possible to manage an event for each object model and the action control at the level of an associated object.

The workflow engine 22 is used to control the sequence of tasks.

The central server 7 finally comprises tools to represent objects in graphic forms 24, 25, 26 controlling the generation of the graphic representations of each object, and the graphic effects depending on the status of each object.

These tools are used to operate the graphic representations on web access hardware, such as a computer 27, a tablet 28, or a "smartphone"-type digital telephone 29.

Some applications are pre-configured in the form of a configuration file and/or a pre-configured database 30, 31, 32, for example, for urban lighting control applications or closed circuit surveillance.

The invention claimed is:

1. A computer and electronic platform to control different categories of urban equipment, the computer and electronic platform comprising a database in which are recorded:

category-related digital representations of each category, the category-related digital representations comprising:
 a plurality of attributes specific to the category in question; and
 functional scripts controlling processes applied regularly;

to each item of equipment, a digital object of which a structure is determined by the digital representation associated to the category, and of which attribute values are determined by a physical state of the associated equipment;

a dialogue and interfacing layer common to the digital representations, and providing exchanges of digital data between the equipment in each category and the associated digital object;

communications drivers associated to each equipment, providing conversion of physical data into digital data used to refresh the attribute values of the digital objects associated with the equipment;

globalized digital representations comprising;
 a plurality of attributes specific to a grouping of linked category-related representations; and functional scripts controlling processes applied regularly;

for a heterogeneous subset of equipment, a globalized digital object of which a structure is determined by the digital representations associated with the subset, and of which the attribute values are calculated depending on the attribute values of the linked category-related digital objects of the subset;

wherein a frequency of the exchanges of digital data between the equipment in each category and the associated digital object controlled by the dialogue and interfacing layer is constant; and wherein the control platform has a variable frequency control circuit for calculation processing of the attribute values of globalized digital objects depending on the attribute values of the category-related digital objects linked to the subset, the calculation frequency of the globalized digital objects being lower than the calculation of the attributes of the linked digital objects.

2. The platform of claim 1, wherein at least one of the attribute values of an attribute of a globalized digital object is calculated depending on digital data coming from a source other than a linked category-related representation.

3. The platform of claim 2, wherein at least one of the attribute values of an attribute of a globalized digital object is calculated depending on the attribute values of the linked category-related digital objects related to the subset, the calculation processing being chosen from a processing family comprising:
- a summation of the attribute values of the linked digital objects;
- the calculation of the maximum, minimum, median or mean attribute values for the linked digital objects;
- a logical operator or a logical function applied to the linked digital objects; and
- a conditional operation applied to the linked digital objects.

4. The platform of claim 1, wherein:
some of the equipment is statistical; and
some of the equipment is mobile and comprises geo-location resources of which the state is transmitted to the communications driver by a radio-frequency link.

5. The platform of claim 4, wherein the platform comprises at least one viewing terminal controlled by a calculator depending on the attribute values of at least part of the globalized digital objects or the category-related digital objects.

6. The platform of claim 5, wherein the at least one viewing terminal also includes resources to send control data processed by functions of at least part of the category-related digital objects to control a change in state of the associated equipment.

7. The platform of claim 6, wherein the platform comprises automated resources to send control data processed by the functions of at least part of the category-related digital objects to control an automatic change in state of the associated equipment.

8. The platform of claim 7, wherein the database also comprises reference value records, and regular comparison resources of the attribute values and the reference values to conditionally trigger an action.

9. The platform of claim 8, wherein at least some of the attribute values are recorded with a history of variations in the attribute values.

10. The platform of claim 1, wherein:
some of the equipment is statistical; and
some of the equipment is mobile and comprises geo-location resources of which the state is transmitted to the communications driver by a radio-frequency link.

11. The platform of claim 1, wherein the urban equipment control platform comprises at least one viewing terminal controlled by a calculator depending on the attribute values of at least part of the globalized digital objects or the category-related digital objects.

12. The platform of claim 1, further comprising a viewing terminal, the viewing terminal including resources to send control data processed by functions of at least part of the category-related digital objects to control a change in state of the associated equipment.

13. The platform of claim 1, further comprising automated resources to send control data processed by functions of at least part of the category-related digital objects to control an automatic change in state of the associated equipment.

14. The platform of claim 1, wherein the database also comprises reference value records, and regular comparison resources of the attribute values and the reference values to conditionally trigger an action.

15. The platform of claim 1, wherein at least some of the attribute values are recorded with a history of variations in the attribute values.

16. A platform for controlling a plurality of categories of urban equipment, the platform comprising a database comprising:
category-related digital representations of each category of the plurality of categories of urban equipment, the digital representations comprising:
a plurality of attributes specific to a respective category; and
functional scripts controlling processes applied regularly;
a plurality of digital objects representing each item of urban equipment of each category of the plurality of categories of urban equipment, wherein a structure of each digital object is determined by a respective digital representation of the associated category of urban equipment, the plurality of digital objects each having attribute values determined based on a physical state of a respective item of urban equipment;
a dialogue and interfacing layer common to the digital representations and for enabling exchanges of digital data between the urban equipment in each category and the urban equipment's associated digital object;
communications drivers associated with each item of urban equipment and for converting physical data into digital data utilized to re-determine the attribute values of the plurality of digital objects; and
globalized digital representations comprising:
a plurality of group attributes specific to a grouping of linked category-related representations; and
functional scripts controlling processes applied regularly; and
a plurality of globalized digital objects each representing a heterogeneous subset of urban equipment, wherein a structure of each globalized digital object is determined by respective digital representations of the associated categories of urban equipment within the subset of urban equipment, the plurality of globalized digital objects each having group attribute values determined based on the plurality of attribute values of the associated digital objects of the items of urban equipment within the subset of urban equipment;

wherein a frequency of the exchanges of digital data between each item of urban equipment in each category and the item's associated digital object is constant; and wherein the control platform comprises a variable frequency control circuit for determining the group attribute values of the globalized digital objects based on the attribute values of the digital objects of the items of urban equipment within the subset, wherein the calculation frequency of the group attribute values of the globalized digital objects is lower than the calculation of the attribute values of the digital objects of the items of urban equipment within the subset.

17. A platform for controlling urban equipment, the platform comprising a database comprising:

digital representations of each category of a plurality of categories of urban equipment;

a plurality of digital objects representing each item of urban equipment of each category of the plurality of categories of urban equipment, wherein a structure of each digital object is determined based at least partially on a respective digital representation of an associated category of urban equipment of the respective item of urban equipment and a physical state of the respective item of urban equipment;

a dialogue and interfacing layer enabling exchanges of digital data between the urban equipment the plurality of digital objects;

communications drivers for converting physical data into digital data utilized to re-determine the plurality of digital objects; and at least one globalized digital representations of at least one grouping of digital representations; and at least one globalized digital object representing a heterogeneous subset of urban equipment, wherein a structure of the at least one globalized digital object is determined based at least partially on the digital representations of the categories of urban equipment within the subset of urban equipment and the associated digital objects of the items of urban equipment within the subset of urban equipment;

wherein the control platform comprises a variable frequency control circuit for determining at least portions of the globalized digital objects based on the digital objects of the items of urban equipment within the subset, wherein the determination frequency of the at least portions of the globalized digital objects is lower than the determination frequency of the digital objects of the items of urban equipment within the subset.

* * * * *